United States Patent [19]

Koshi

[11] Patent Number: 5,076,335
[45] Date of Patent: Dec. 31, 1991

[54] ANTISKID DEVICE HAVING ROTATABLE CROSSBANDS

[76] Inventor: Masaki Koshi, Yoyogi 4-chome, Shibuya-ku, Tokyo, Japan

[21] Appl. No.: 543,846
[22] PCT Filed: Aug. 31, 1989
[86] PCT No.: PCT/JP89/00895
    § 371 Date: Jul. 24, 1990
    § 102(e) Date: Jul. 24, 1990
[87] PCT Pub. No.: WO90/06239
    PCT Pub. Date: Jun. 14, 1990

[30] Foreign Application Priority Data

Nov. 30, 1988 [JP] Japan .................. 63-303005

[51] Int. Cl.⁵ ............................................. B60C 27/20
[52] U.S. Cl. ................................... 152/226; 152/219; 152/225 R; 152/241
[58] Field of Search ................... 152/213, 225 R, 226, 152/225 C, 216, 219, 227, 228, 233, 236, 237, 241, 242

[56] References Cited

U.S. PATENT DOCUMENTS

| | | | |
|---|---|---|---|
| 1,320,916 | 11/1919 | Randolph | 152/241 |
| 3,380,779 | 4/1968 | Albright | 152/225 |
| 4,262,723 | 4/1981 | Bourcier de Caron | 152/222 |
| 4,275,781 | 6/1981 | Riedel | 152/223 |
| 4,799,522 | 1/1989 | Ilon | 152/241 |
| 4,922,982 | 5/1990 | Metraux | 152/241 |

FOREIGN PATENT DOCUMENTS 54-6252 1/1979 Japan .
57-191106 11/1982 Japan .

Primary Examiner—Ball Michael W.
Assistant Examiner—Gregory J. Wilber
Attorney, Agent, or Firm—Oblon, Spivak, McClelland, Maier & Neustadt

[57] ABSTRACT

Described herein is a crossband device to be mounted on a vehicle tire to prevent tire slips on snowy roads. The crossband device including an inner ring detachably fixable to the outer side of a wheel of the vehicle, an outer ring rotatably supported on the inner ring, a plural number of elastically deformable leaf springs extended radially outward from the outer ring, anti-slip crossbands extended contiguously from the fore ends of the leaf springs crosswise of the tread surface of the tire, and an endless circumferential band interconnecting the crossbands. The crossbands are turnable to and from a position on the tread surface of the tire and a position away from the tread surface by elastic deformation of the respective leaf springs. In driving operation of the vehicle, variations in tire diameter which occur due to flexure of the ground-contacting portion of the tire as well as displacements of the crossbands in the circumferential direction along the tread surface of the tire are suitably absorbed by elastic deformation of the leaf springs and rotation of the outer ring.

9 Claims, 3 Drawing Sheets

ANTISKID DEVICE HAVING ROTATABLE CROSSBANDS

BACKGROUND OF THE INVENTION

1. Field of the Invention

This invention relates to a crossband device for an automobile tire, which is attached to the automobile tire to prevent tire slips during travel on snow-covered roads.

2. Description of the Prior Art

In a prior application, Japanese Patent Application 63-155675, the present inventor proposed an anti-slip crossband device of this sort, which is composed of a main body detachably attachable to the outer side of an automobile wheel, a plural number of leaf springs operable to turn in both forward and reverse directions about the respective axes and extended radially outward from the main body, and anti-slip crossbands attached to the fore ends of the leaf springs to lie in abutting contact with the tread surface of the tire to prevent slips. When driving on a snowy road, this cross-band device is attached to the outer side of an automobile wheel, and the crossbands are brought into abutting engagement with the tread surface of the tire by turning the leaf springs. When not used, the crossbands are displaced into receded positions away from the tread surface by turning the leaf springs, and then the crossband device is removed from the automobile wheel and put away in a folded state in a trunk room or other suitable place on the vehicle.

The above-described crossband device has advantages that it can be easily attached to the outer side of an automobile wheel by the use of wheel nuts and that, when not necessary, it can be removed from the wheel and folded into a compact form suitable for storage in a trunk room of the vehicle. However, it is arranged to turn the leaf springs in forward and reverse directions by a handle operation through a gear mechanism, which is complicated in construction, troublesome to manipulate, and high in production cost.

Further, it is important for a crossband device of this sort to take into account the variations in tire diameter which occur during travel of a vehicle due to flexing of the ground-contacting portion of the tire, as well as the displacements of the crossbands in the circumferential direction along the tread surface at the ground-contacting portion of the tire.

SUMMARY OF THE INVENTION

Under these circumstances, it is an object of the present invention to provide a crossband device for use on snowy roads, which in inexpensive and of simple construction dispensing with the complicated rotational operating mechanism including a handle and gears, and which permits a user to turn the leaf springs easily and securely to move the crossbands to and from a position in abutting engagement with the tread surface of a tire and a position away from the tread surface, while coping with variations in tire diameter and displacements of the crossbands in a reliable manner during vehicle travel.

In accordance with the present invention, for achieving the above-mentioned objectives, there is provided a crossband device to be attached to an automobile tire on snowy roads, which essentially includes: an inner ring removably attachable to the outer side of an automobile wheel through wheel nuts; an outer ring supported by the inner ring rotatably about the center axis thereof to follow movements of crossbands in the circumferential direction along the tread surface of the tire; a number of elastically deformable leaf springs extended radially outward from the outer ring; anti-slip crossbands attached contiguously to the fore ends of the leaf springs in intersecting relation with the tread surface of the tire; and an endless circumferential band connecting the respective crossbands.

With the cross-band device of the present invention, after attaching the inner ring to the outer side of an automobile wheel through wheel nuts, the crossbands can be positioned in intersecting relation with the tread surface of the tire simply through elastic deformation of the respective leaf springs. At this time, the circumferential band and crossbands cannot be placed under the tread surface at the ground-contacting portion of the tire. However, since the leaf springs at that portion are in flexed state, the circumferential band and crossbands can be automatically urged into positions under the tread surface by the resiliency of the leaf springs upon moving the vehicle slightly forward or backward.

The variations in tire diameter, which occur as a result of flexing of the ground-contacting portion of the tire when the vehicle is in travel, are absorbed by elastic deformation of the leaf springs, while the displacements of the crossbands, which occur in the circumferential direction along the tread surface at the ground-contacting portion, are absorbed by rotation of the outer ring and flexing of the leaf springs, thereby preventing fracturing damages of the crossbands and leaf springs.

When the crossband device is not used, it can be removed from the wheel by detaching the inner ring from the wheel nuts and taking the circumferential band and the respective crossbands away from the tread surface of the tire. On such an occasion, although the crossbands and circumferential band at the ground-contacting portion are trodden the tire and therefore cannot be immediately removed therefrom, they can be released by moving the vehicle slightly forward or backward after laying other portions of the device flatly on the ground.

In this manner, the crossband device can be easily attached to or detached from a car wheel. Besides, simply by elastic deformation of the leaf springs, the crossbands can be turned to and from a position in abutting engagement with the tread surface of a tire and a position away from the tread surface, coupled with additional advantages such as extremely simplified construction and handling and low production cost.

For the purpose of mounting the crossband device on a vehicle wheel, the inner ring is centrally provided with a mount portion which is fixable accurately to a predetermined position on the wheel in a facilitated manner.

As means for supporting the outer ring rotatably on the inner ring, it is preferred to provide a groove on one of the rings, more specifically, either around the outer periphery of the inner ring or around the inner periphery of the outer ring for sliding engagement with a fitting portion provided opposingly on the other ring. By the use of this mechanism, the construction of the support means can be simplified to a significant degree.

The crossbands and circumferential band are each constituted by a flat, strip-like band of a durable synthetic resin material, with metal spike pins planted on the outer side thereof.

On the other hand, the leaf springs are each formed of a flattened narrow strip of steel or a synthetic resin material. When using leaf springs of a synthetic resin material, they can be formed integrally with the crossbands.

Further, the crossband may consist of a single linear strip or may be formed in V-shape if desired.

DESCRIPTION OF PREFERRED EMBODIMENTS

Figure 1:
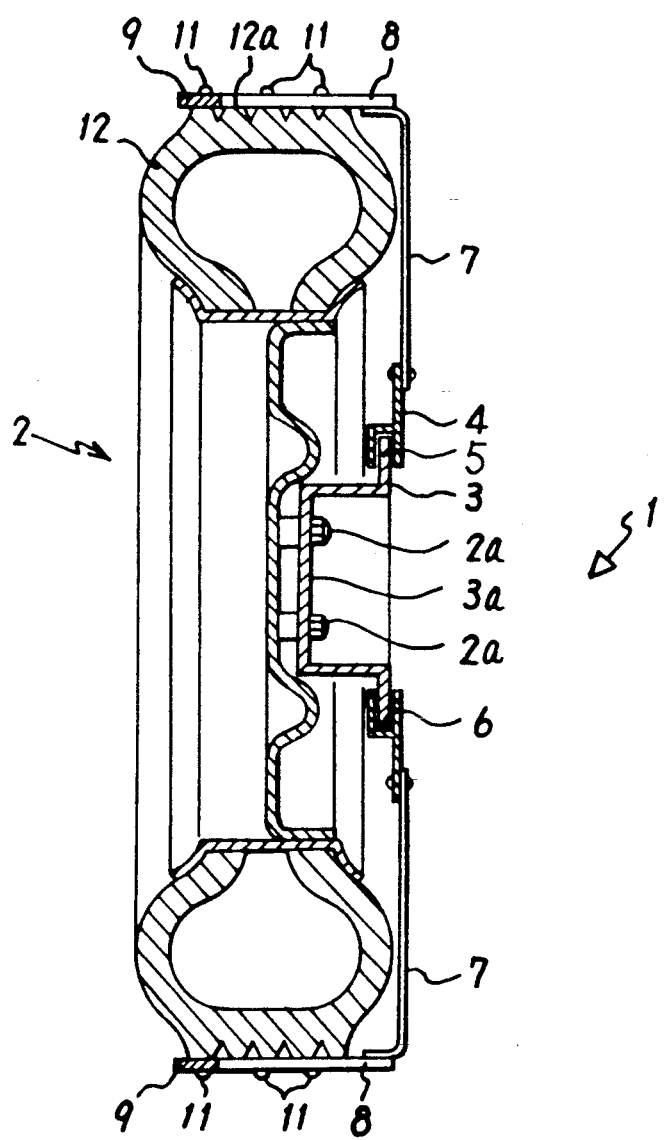
FIG. 1 is a vertical section of a crossband device embodying the present invention, the crossband device being fitted on a vehicle wheel.

Now, the invention is described more particularly by way of preferred embodiments shown in the drawings.

Figure 2:
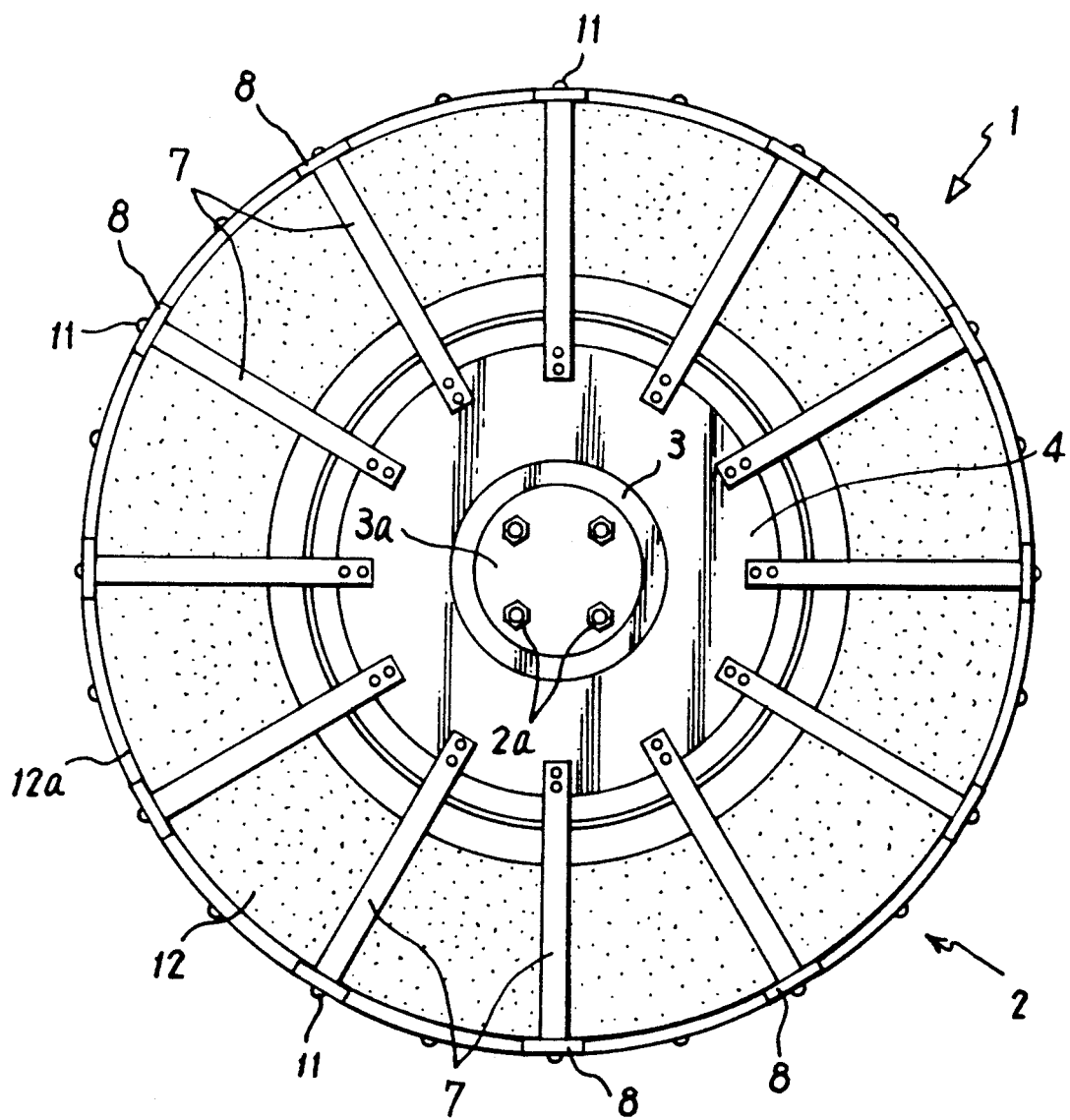
FIG. 2 is a front view of the crossband device.

Referring to FIGS. 1 and 2, there is illustrated a crossband device 1 of the invention, which is mounted on a vehicle wheel 2. The crossband device 1 has an inner ring 3 which is detachably fixable on wheel 2, and an outer ring 4 which is supported by the inner ring 3. The inner ring 3 is provided with a recessed mount portion 3a which is sunken toward the wheel 2 and concentrically fixable to the outer side of the wheel 2 by way of wheel nuts 2a. On the other hand, the outer ring 4 is provided with a groove 6 around its inner periphery for sliding engagement with a fitting portion 5 which is formed around the outer periphery of the inner ring 3. As a result, the outer ring 4 is supported by the inner ring 3 concentrically and relatively rotatably about the center axis of the inner ring 3. Conversely, the groove 6 may be formed around the outer periphery of the inner ring 3 and slidably engaged with a fitting portion which is formed around the inner periphery of the outer ring 4 if desired.

Figure 3:
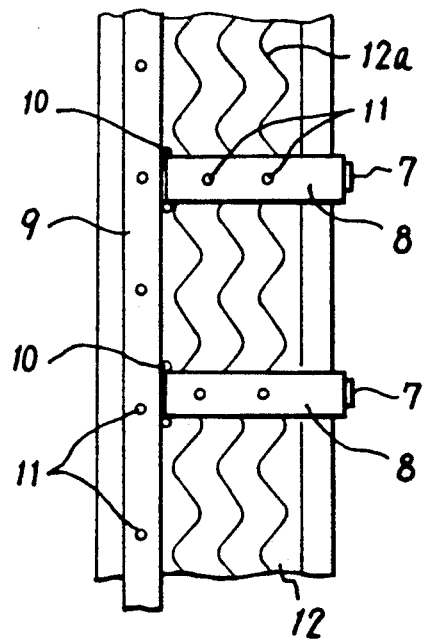
FIG. 3 is a plan view of major components of the device.

Extended radially outward of the outer ring 4 are a suitable number of leaf springs 7 which are, for example, in the form of flattened narrow strips of steel or a synthetic resin material capable of elastic deformation such as bending and twisting and which has the respective base ends securely fixed to the outer ring 4 substantially at equidistant positions around the circumference of the latter. An anti-slip crossband 8 is contiguously attached to the fore end of each leaf spring 7 to extend crosswise of the tread surface 12a of a tire 12. As seen in FIG. 3, the fore end of each crossband 8 is secured by a connector member 10 to an endless circumferential band 9 which interconnects the respective crossbands 8.

The crossbands 8 and the circumferential band 9 are each constituted by planting a suitable number of metal spike pins 11 on the outer side of a flat strip-like band 8 or 9 of a durable synthetic resin material with excellent resistance to abrasive wear and coldness. Alternatively, other durable strips with anti-slip surfaces may be employed for the crossband 8 and the circumferential band 9. In case the leaf spring 7 of a synthetic resin material are employed, they may be formed integrally with the crossbands 8.

Figure 4:
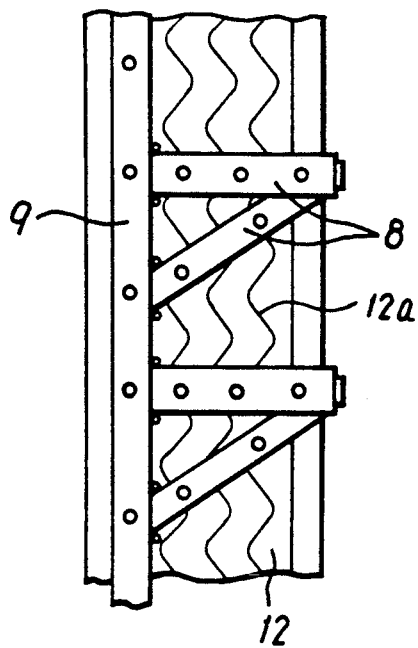
FIGS. 4 and 5 are views similar to FIG. 3 but showing modifications of the crossband device of the invention.
Figure 5:
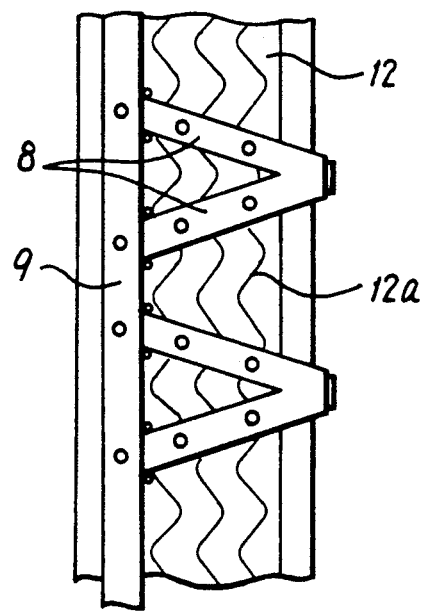

The cross bands 8 are not restricted to a single linear strip as shown particularly in FIG. 3, and may be formed in an outwardly diverging V-shape as shown in FIGS. 4 and 5 or in any other suitable shapes if desired.

In order to use the crossband device of the above-described construction, the inner ring 3 is mounted on the outer side of the automobile wheel 2 through the wheel nuts 2a, and then the respective crossbands are abuttingly engaged with the tread surface 12a of the tire 12 in intersecting relation therewith by the use of resilient force of the leaf springs 7.

At this time, the circumferential band 9 and crossbands 8 cannot be placed on the tread surface 12a at the ground-contacting portion of the tire 12. However, since the leaf springs 7 which support the crossbands 8 are in resiliently flexed state at that portion, the circumferential band 9 and crossbands 8 can be automatically urged onto the ground-contacting tread surface by resilient restoring force of the leaf springs 7 as soon as the vehicle is moved slightly forward or backward.

As mentioned hereinbefore, while the vehicle is in travel, variations in tire diameter occur due to flexure of the tire at the ground-contacting portion. These variations are suitably absorbed by bending deformation of the leaf springs 7. In case the crossbands 8 at the ground-contacting portion are displaced in the circumferential direction along the tread surface 12a of the tire 12, these displacements are absorbed by flexure of the leaf springs 7 and rotation of the outer ring 4 to prevent fracturing damages of the crossbands 8 and leaf springs 7.

When the crossband device becomes unnecessary, the inner ring 3 is detached from the wheel nuts 2a, and then the crossbands 8 are shifted into receded positions away from the tread surface 12a of the tire 12 to remove the device 1 from the wheel 2.

At this time, the crossbands 8 and circumferential band 9 at the ground-contacting portion are trodden by the tire 12 so that they cannot be immediately removed therefrom. However, by moving the vehicle slightly forward or backward after laying other portions of the device 1 flatly on the ground, the crossbands 8 and the circumferential band 9 under the tire can be readily removed from the tread surface 12a.

The crossband device 1 which has been removed from the wheel 2 can be handily stored in the trunk room of the vehicle or the like.

Although the crossband device of the invention has been described by way of preferred embodiments, it is to be understood that the invention is not restricted to the particular forms shown in the foregoing description and drawings.

What is claimed is:

1. A crossband device for use on a vehicle tire on a snowy road, comprising:

an inner ring detachably fixable to an outer side of a vehicle wheel through wheel nuts;

an outer ring rotatable about the center axis of the inner ring and supported by said inner ring rotatably about the center axis thereof to follow movements of crossbands in the circumferential direction along the tread surface of said tire;

a plurality of elastically deformable leaf springs extended radially outward from said outer ring;

anti-slip crossbands contiguously connected to fore ends of said leaf springs to extend crosswise of the tread surface of said tire; and a circumferential band interconnecting said crossbands.

2. A crossband device as defined in claim 1, wherein said inner ring is centrally provided with a mount portion and concentrically attachable to the outer side of said wheel through said mount portion.

3. A crossband device as defined in claim 1, wherein a groove is provided either around an outer periphery of said inner ring or around an inner periphery of said outer ring, and slidably engaged with a fitting portion provided opposingly on the other ring, thereby supporting said outer ring rotatably on said inner ring.

4. A crossband device as defined in claim 1, wherein said crossbands and said circumferential band are each constituted by a flat strip band of a durable synthetic resin material with metal spike pins planted on the outer side thereof.

5. A crossband device as defined in claim 1, wherein said leaf springs are each constituted by a flattened narrow strip of steel.

6. A crossband device as defined in claim 1, wherein said leaf springs are each formed of a synthetic resin material.

7. A crossband device as defined in claim 6, wherein said leaf springs and said crossbands are integrally formed of a synthetic resin material.

8. A crossband device as defined in claim 1, wherein said crossbands are each in the form of a single linear strip.

9. A crossband device as defined in claim 1, wherein said crossbands are formed in V-shape.

* * * * *